(12) United States Patent
Puskarich (10) Patent No.: US 11,656,586 B1
(45) Date of Patent: May 23, 2023

(54) SYSTEMS AND METHODS FOR DEVICE CONFIGURATION

(71) Applicant: Apple Inc., Cupertino, CA (US)

(72) Inventor: Paul G. Puskarich, London (GB)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/334,516

(22) Filed: May 28, 2021

Related U.S. Application Data (60) Provisional application No. 63/047,863, filed on Jul. 2, 2020.

(51) Int. Cl.
*G05B 15/02* (2006.01)
*G06F 3/0488* (2022.01)
*G06F 3/0482* (2013.01)

(52) U.S. Cl.
CPC .......... *G05B 15/02* (2013.01); *G06F 3/0482* (2013.01); *G06F 3/0488* (2013.01)

(58) Field of Classification Search
CPC ...... G06F 3/0482; G06F 3/0488; G05B 15/02
See application file for complete search history.

(56) References Cited

U.S. PATENT DOCUMENTS

| | | | |
|---|---|---|---|
| 9,071,702 B2 | 6/2015 | Choi et al. | |
| 10,425,284 B2 | 9/2019 | Dellinger et al. | |
| 10,809,900 B2 * | 10/2020 | Aube | G06F 9/451 |
| 11,019,193 B2 | 5/2021 | Dellinger et al. | |
| 2003/0018744 A1 * | 1/2003 | Johanson | H04W 8/005 |
| | | | 709/217 |
| 2011/0083111 A1 * | 4/2011 | Forutanpour | H04W 4/21 |
| | | | 715/863 |
| 2019/0196609 A1 * | 6/2019 | Aube | G06F 9/451 |

OTHER PUBLICATIONS

Hazas et al., "A Relative Positioning System for Co-located Mobile Devices", published: May 4, 2005, Lancaster University, United Kingdom, University of Karlsruhe, Germany, https://www.usenix.org/legacy/publications/library/proceedings/mobisys05/tech/full_papers/hazas/hazas_html/MobiSys2005.html (Year: 2005).*

* cited by examiner

*Primary Examiner* — Seth A Silverman
(74) *Attorney, Agent, or Firm* — BakerHostetler (57) ABSTRACT

A system can provide mechanisms for managing devices that lack certain user interfaces by operation of a separate device that includes a user interface. Such user interfaces, such as a display and/or a user input element can be operated on one device (e.g., a user interface device) to manage the operational parameters of a different device (e.g., a managed device). The user interface device can provide input and/or output features when the managed device is brought into a vicinity of the user interface device. The selected operational parameters can then be applied when the managed device is operated independently of the user interface device and/or with another device.

15 Claims, 5 Drawing Sheets

SYSTEMS AND METHODS FOR DEVICE CONFIGURATION

CROSS-REFERENCE TO RELATED APPLICATION

This application claims the benefit of U.S. Provisional Application No. 63/047,863, entitled "SYSTEMS AND METHODS FOR DEVICE CONFIGURATION," filed Jul. 2, 2020, the entirety of which is incorporated herein by reference.

TECHNICAL FIELD

The present description relates generally to device configuration, including to systems that provide a display-based interface for configuration of other devices.

BACKGROUND

Devices can have a variety of operational parameters by which they perform a variety of functions. Given the range of functions that can be performed by any given device, it can be desirable to modify the operational parameters to suit a given set of circumstances, conditions, and/or preferences. Such operational parameters can be configured by a user by providing a user interface for selecting, modifying, and/or changing the operational parameters.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Devices can have a variety of operational parameters by which they perform a variety of functions. Given the range of functions that can be performed by any given device, it can be desirable to modify the operational parameters to suit a given set of circumstances, conditions, and/or preferences. Such operational parameters can be configured by a user by providing a user interface for selecting, modifying, and/or changing the operational parameters.

Some devices may lack certain types of user interfaces. For example, some devices may lack a display for providing visual output to a user in relation to an operational parameter. By further example, some devices may lack a user input element for receiving input from a user in relation to an operational parameter. It can nonetheless be desirable to manage the operational parameters of such devices so that they perform their functions according to input from a user.

Systems and devices of the present disclosure can provide mechanisms for managing devices that lack certain user interfaces by operation of a separate device that includes a user interface. Such user interfaces, such as a display and/or a user input element can be operated on one device (e.g., a user interface device) to manage the operational parameters of a different device (e.g., a managed device). The user interface device can provide input and/or output features when the managed device is brought into a vicinity of the user interface device. The selected operational parameters can then be applied when the managed device is operated independently of the user interface device and/or with another device.

These and other embodiments are discussed below with reference to FIGS. 1-8. However, those skilled in the art will readily appreciate that the detailed description given herein with respect to these Figures is for explanatory purposes only and should not be construed as limiting.

Figure 1:
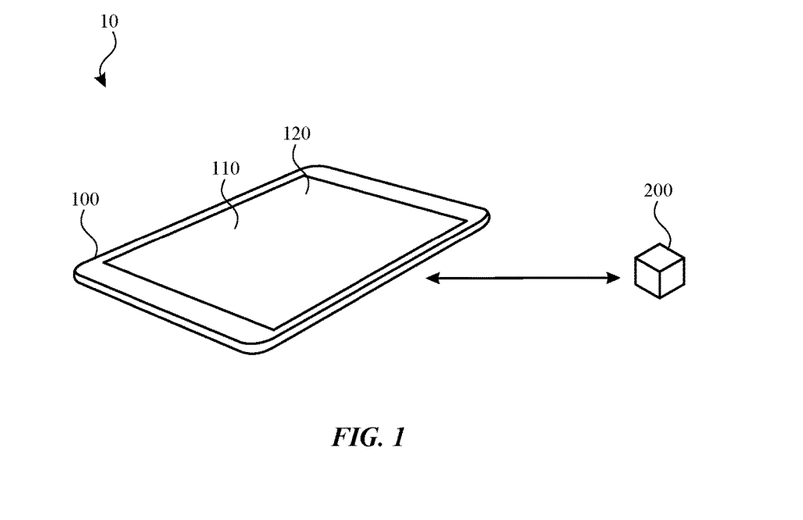
FIG. 1 illustrates an example system in which a user interface device can manage operational parameters of a managed device in accordance with one or more implementations.

FIG. 1 illustrates an example system 10 in which a managed device can be managed by a user interface device providing user interface capabilities that are not provided by the managed device. As shown in FIG. 1, the system 10 includes a user interface device 100 and a managed device 200. An example user interface device 100 and/or managed device 200 may be, and/or may include all or part of, the devices discussed below with respect to FIG. 2 and/or the system discussed below with respect to FIG. 8.

The user interface device 100 can be or include one more of a variety of devices that can be operated by a user. For example, the user interface device 100 can be a tablet, a phone, a laptop computing device, a desktop computing device, a wearable device, a head-mountable device, a watch, a mobile computing device, a tablet computing device, a television, a phone, a digital media player, a kiosk station, and/or any other electronic device providing user interface capabilities. It will be understood that yet other examples of user interface devices are within the scope of the present disclosure.

The user interface device 100 can include input and/or output interface components for allowing a user to interact with the user interface device 100. For example, the user interface device 100 can include a display 110 for providing visual information to a user operating the user interface device 100. The display 110 can provide information relating to the user interface device 100 and/or the managed device 200, as described further herein. For example, the display 110 can provide an indicator relating to an operating parameter of the user interface device 100 and/or the managed device 200.

The display 110 can include, for example, a liquid crystal display (LCD), a light emitting diode (LED) display, an organic light emitting diode (OLED) display, a flexible display, a flat panel display, a solid state display, a projector, or any other device for outputting information. It will be understood that other types of output interface components can be included, such as those providing any form of sensory feedback, such as visual feedback, auditory feedback, or tactile feedback.

The user interface device 100 can further include a user input element 120 that receives input from a user during operation of the user interface device 100. The user input element 120 can allow a user to make selections, modifications, changes, commands, or other inputs relating to the user interface device 100 and/or the managed device 200, as described further herein. For example, the user input element 120 can be operated to manage an operating parameter of the user interface device 100 and/or the managed device 200.

A user input element 120 can include, for example, an alphanumeric keyboard, a pointing device ("cursor control devices"), a trackpad, a mouse, a trackball, a game controller, a remote control, a stylus, a joystick, and the like. A user input element 120 can include devices that function as both input and output devices, such as a touchscreen that is overlaid with and/or integrated with the display 110. It will be understood that other types of input interface components can be included, such as receiving input in any form, including acoustic, speech, or tactile input.

The system 10 further includes the managed device 200. The managed device 200 can be a device that lacks at least one input and/or output interface components that is provided by the user input element 120. For example, the managed device 200 can lack or omit a display 110 and/or a user input element 120. Optionally, the managed device 200 can include one or more other input and/or output interface components, but such components may perform functions other than managing one or more certain operating parameters of the managed device 200. As such, the user may be limited by the interface capabilities of the managed device 200 alone. Nonetheless, the user interface device 100 can provide interface capabilities to the managed device 200 when the system 10 is used in concert.

The managed device 200 can be or include one more of a variety of devices that operates according to operating parameters that are managed by the user interface device 100. For example, the user interface device 100 can be a mouse, a trackball, a trackpad, a keyboard, an audio output device, a smart speaker, a home assistant, a media player, a wearable device, a user-monitoring device, a biosensor device, a stylus, a joystick, a game controller, a charging device. It will be understood that yet other examples of managed devices are within the scope of the present disclosure.

As used herein, operating parameters of the managed device 200 can include any settings, configurations, recorded data, preferences, and/or rules upon which the operations of the managed device 200 are based. In particular, operating parameters can be those on which the managed device 200 bases its operations even when not used in concert with the user interface device 100. As such, the operating parameters can be managed via the user interface device 100 and recorded by the managed device 200 for later reference throughout one or more operations of the managed device 200. Such operating parameters can be managed as needed by returning the managed device 200 to the user interface device 100.

Figure 2:
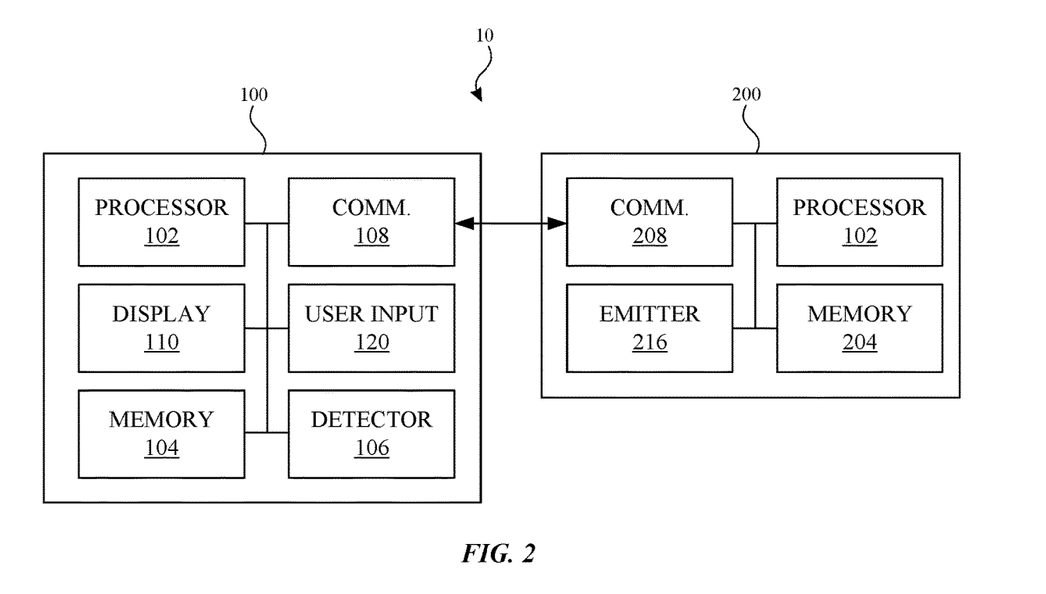
FIG. 2 illustrates a block diagram of a system comprising a user interface device and a managed device in accordance with one or more implementations.

FIG. 2 illustrates an example system that may be used to manage a managed device by operation of a user interface device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example user interface device 100 and/or the managed device 200 may be implemented on another device.

The user interface device 100 may include a processor 102, a memory 104, a communication interface 108, a detector 106, a display 110, and/or a user input element 120. The processor 102 may include suitable logic, circuitry, and/or code that enable processing data and/or controlling operations of the user interface device 100. In this regard, the processor 102 may be enabled to provide control signals to various other components of the user interface device 100. The processor 102 may also control transfers of data between various portions of the user interface device 100. Additionally, the processor 102 may enable implementation of an operating system or otherwise execute code to manage operations of the user interface device 100. The memory 104 may include suitable logic, circuitry, and/or code that enable storage of various types of information such as received data, generated data, code, and/or configuration information. The memory 104 may include, for example, random access memory (RAM), read-only memory (ROM), flash, and/or magnetic storage.

The communication interface 108 may include suitable logic, circuitry, and/or code that enables wired or wireless communication, such as with the managed device 200. The communication interface can be a wireless communication interface. The communication interface 108 may include, for example, one or more of a near-field communication (NFC) interface, an ultra-wideband (UWB) communication interface, a radio-frequency identification (RFID) communication interface, a Bluetooth communication interface, a Zigbee communication interface, a WLAN communication interface, a USB communication interface, or generally any communication interface.

The detector 106 can be a component that detects a presence, absence, location, and/or orientation of the managed device 200 with respect to the user interface device 100. For example, the detector 106 can determine whether the managed device 200 is within a vicinity of the user interface device 100. The detector 106 can include or communicate with one or more of the elements of the communication interface 108. For example, the detector 106 and/or the communication interface 108 can include or communicate with one or more antennas. Such antennas can be used for both information exchange and the physical detection of the devices relative to each other. The detection can be performed based on characteristics of the communication (e.g., signal strength, etc.). Additionally or alternatively, the detector 106 can operate independently of the communication interface 108, for example, based on separate emissions from the managed device 200.

In one or more implementations, one or more of the processor 102, the memory 104, the communication interface 108, the detector 106, the display 110, and/or the user input element 120, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

The managed device 200 may include a processor 202, a memory 204, a communication interface 208, and/or an emitter 216. The processor 202 may include suitable logic, circuitry, and/or code that enable processing data and/or controlling operations of the managed device 200. In this regard, the processor 202 may be enabled to provide control signals to various other components of the managed device 200. The processor 202 may also control transfers of data between various portions of the managed device 200. Additionally, the processor 202 may enable implementation of an operating system or otherwise execute code to manage operations of the managed device 200. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The communication interface 208 may include suitable logic, circuitry, and/or code that enables wired or wireless communication, such as with the user interface device 100. The communication interface can be a wireless communication interface. The communication interface 208 may include, for example, one or more of a near-field communication (NFC) interface, an ultra-wideband (UWB) communication interface, a radio-frequency identification (RFID) communication interface, a Bluetooth communication interface, a Zigbee communication interface, a WLAN communication interface, a USB communication interface, or generally any communication interface.

The emitter 216 can be a component that emits a signal (e.g., wireless) for detection by the detector 106 of the user interface device 100. For example, the user interface device 100 can determine whether the managed device 200 is within a vicinity of the user interface device 100 based on the emissions of the emitter 216. The emitter 216 can include or communicate with one or more of the elements of the communication interface 108. Additionally or alternatively, the detector 106 can operate independently of the communication interface 108, for example, based on separate emissions from the managed device 200. It will be understood that the emissions can be or include electromagnetic radiation, light, sound, pressure waves, and the like.

In one or more implementations, one or more of the processor 202, the memory 204, the communication interface 208, the emitter 216, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
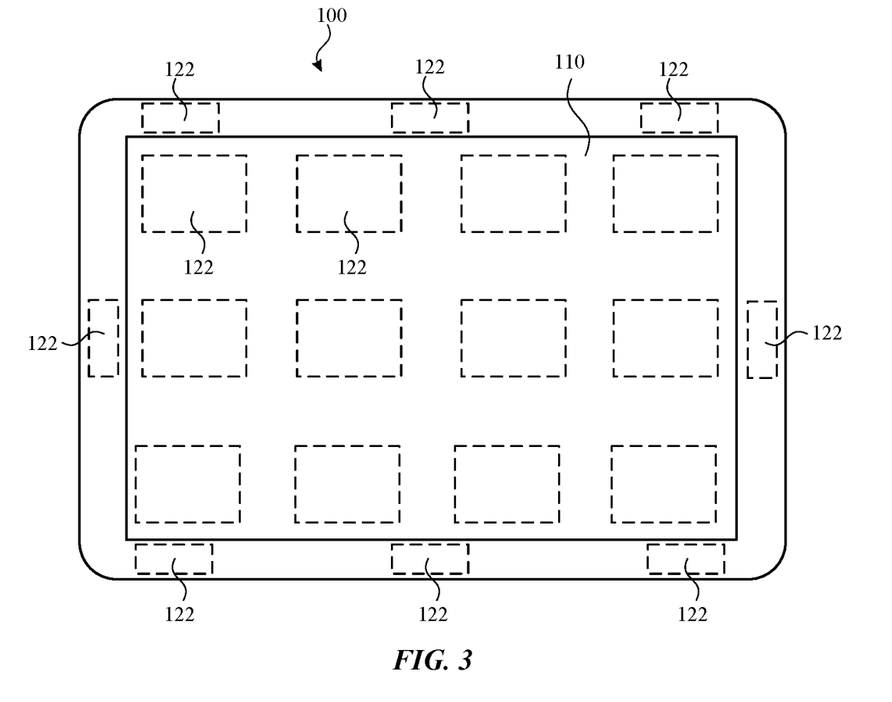
FIG. 3 illustrates a user interface device having an antenna arrangement in accordance with one or more implementations.

FIG. 3 illustrates a user interface device having an antenna arrangement in accordance with one or more implementations. As shown in FIG. 3, the user interface device 100 can include an array of antennas 122 distributed at various locations with respect to the display 110 of the user interface device 100. For example, at least some of the antennas 122 can be distributed about a periphery of the display 110. Additionally or alternatively, at least some of the antennas 122 can be distributed at positions that overlap the display 110. When placed at a variety of positions, each of the antennas 122 can detect the presence and/or absence of a managed device. Such detections can be based on the emissions of the managed device and/or on communications (e.g., wireless communications) between the user interface device and the managed device. For example, each antenna 122 can detect an emission or other characteristic of the managed device 200, and the location of the managed device 200 with respect to each can be determined. Additionally or alternatively, the antennas 122 can be used to triangulate or otherwise determine the position of the managed device 200 with respect to the user interface device 100 and/or a component thereof (e.g., the display 110).

Figure 4:
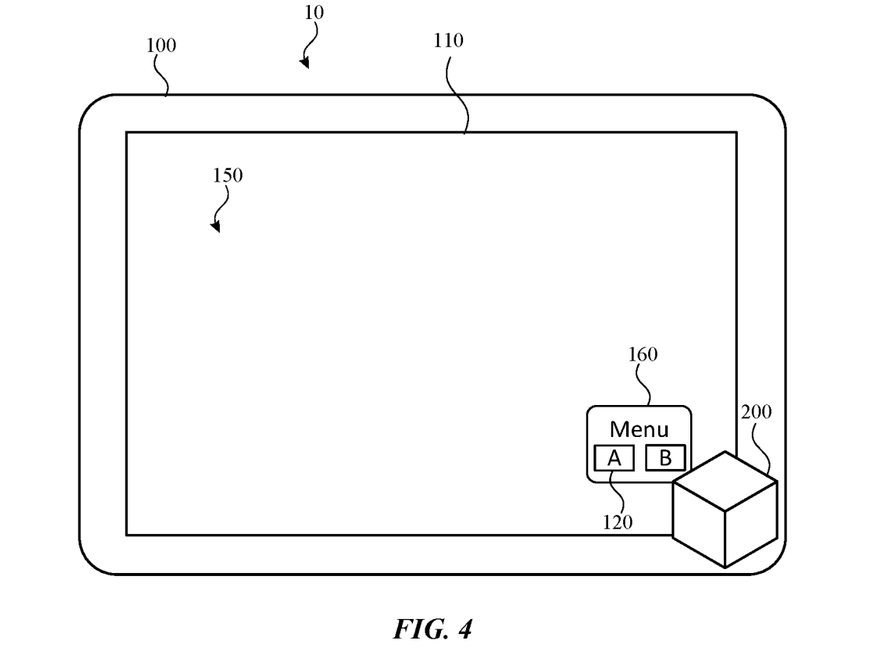
FIG. 4 illustrates a user interface device displaying an example user interface for providing a configuration of a managed device in accordance with one or more implementations.

FIG. 4 illustrates a user interface device displaying an example user interface for providing a configuration of a managed device in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

As shown in FIG. 4, the user interface device 100 can include a display 110 that displays the user interface 150. The user interface 150 can be displayed when the managed device 200 is detected to be within a vicinity of the user interface device 100 and/or a component thereof, such as the display 110, as described herein. For example, a threshold distance can be set such that, if the managed device 200 is determined to be within the threshold distance, the user interface 150 can be displayed.

The user interface 150 can include a menu or other indicator that relates to one or more operating parameters of the managed device 200. For example, the user interface 150 can display an indicator that corresponds to a present value of an operating parameter of the managed device 200. The present value can be based on a communication from the managed device 200 to the user interface device 100, according to a communication protocol there between. Such a communication protocol can be based on queries and responses between the devices and initiated by either one of the devices.

By further example, the user interface 150 can display one or more selectable elements that, when selected, modify an operating parameter of the managed device 200. The user interface device 100 can provide one or more user input elements 120 that facilitate selection by a user, according to the user interface 150. Such selections can be communicated to the managed device 200 (e.g., via a signal) according to a communication protocol between the managed device 200 and the user interface device 100. Such a communication protocol can be based on queries and responses between the devices and initiated by the user interface device 100 in response to a user selection.

The managed device 200, upon receiving a signal indicating a user selection, can record the user selection for reference. For example, the managed device 200 can start, resume, continue, stop, pause, and/or modify operations based on the communicated user selection. By further example, the managed device 200 can modify an operation in progress at the time the user selection is made and communicated. By further example, the managed device 200 can record and/or store the user selection for later reference upon execution of an applicable operation.

User selections can be applicable to the operations of the managed device 200. It will be understood that a variety of operations performed by the managed device 200 can be modified based on a selectable user input. For example, where the managed device 200 is an audio device, the user selections can relate to the play status, volume of audio, selection of media, and/or other characteristics of audio output provided by the managed device 200. By further example, where the managed device 200 is an input device (e.g., mouse, keyboard, etc.), the user selections can relate to the responsiveness, speed, and/or other characteristics of input provided by the managed device 200. By further example, where the managed device 200 is a user monitor device (e.g., health monitor, activity monitor, location tracker, etc.), the user selections can relate to the status, activity, and/or other characteristics of the monitoring provided by the managed device 200.

The user interface 150 can optionally be provided as an overlay among other elements provided on the display 110. For example, the user interface 150, or portions thereof, can occupy only a portion of the display 110, thereby allowing other displayed elements to remain visible. It will be understood that the user interface 150 can occupy any portion and/or all of the display 110.

The user interface 150, or portions thereof, can be displayed at a region of the display 110 that corresponds to the position of the managed device 200 with respect to the user interface device 100 and/or a component thereof (e.g., the display 110). For example, where the managed device 200 is detected to be overlapping a region of the display 110, the user interface 150 can be displayed at least partially at or near such a region. Accordingly, the display 110 can be separated into any number of regions for display of the user interface 150. Such positioning within the user interface 150 can provide confirmation to the user that the appropriate managed device is being recognized.

The user interface 150 can be updated as the managed device 200 moves with respect to the user interface device 100 and/or a component thereof (e.g., the display 110). For example, the user interface device 100 can repeatedly and/or continually detect the position of the managed device 200. If a new position is detected, the user interface 150 can be updated or replaced to display the menu or other indicator at a new location that corresponds to the new position of the managed device 200 with respect to the user interface device 100 and/or a component thereof (e.g., the display 110). Such updates can provide additional confirmation to the user that the appropriate managed device is being recognized.

The user interface 150 can be updated as the managed device 200 moves away from the user interface device 100 and/or a component thereof (e.g., the display 110). For example, the user interface device 100 can repeatedly and/or continually detect the presence of the managed device 200. If the managed device 200 is no longer detected and/or detected to be outside the threshold distance, the user interface 150 can be updated to replace or remove the menu or other indicator.

Figure 5:
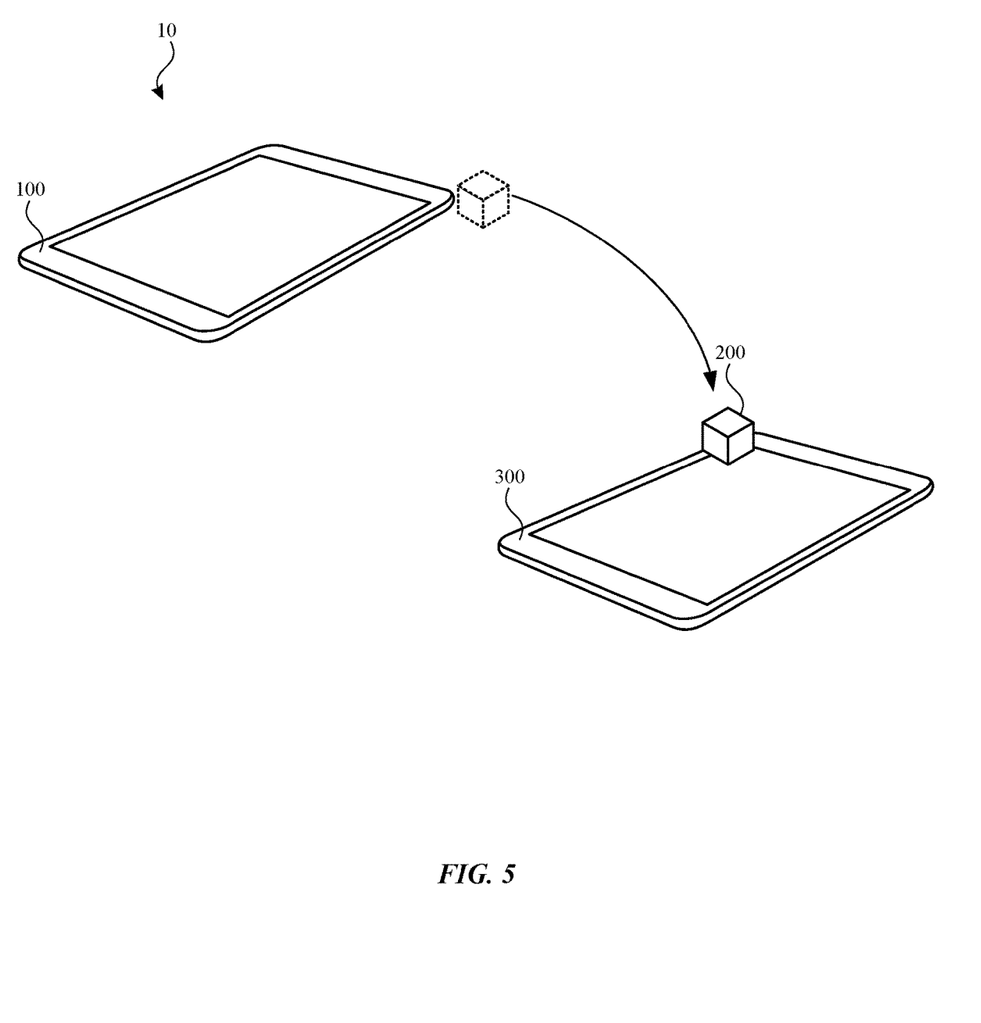
FIG. 5 illustrates an example system in which a user interface device can manage operational parameters of a managed device for use with an additional device in accordance with one or more implementations.

FIG. 5 illustrates an example system in which a user interface device can manage operational parameters of a managed device for use with an additional device in accordance with one or more implementations. As shown in FIG. 5, the managed device 200 can be managed by the user interface device 100, as described herein. Thereafter, the managed device 200 can be moved and/or operated apart from the user interface device 100. Optionally, the managed device 200 can be operated in concert with an additional device 300. The operational parameters set by operation of the user interface device 100 can remain with the managed device 200 until or throughout use with the additional device 300. As such, operation of the managed device 200 with the additional device 300 can be based on operational parameters set by the user interface device 100.

Additionally or alternatively, the additional device 300 can be similar to the user interface device 100. As such, the additional device 300 can provide one or more input and/or output communication interfaces for managing operating parameters of the managed device 200. User selections made by operation of the additional device 300 can complement and/or overwrite prior selections made by operation of the user interface device 100.

Figure 6:
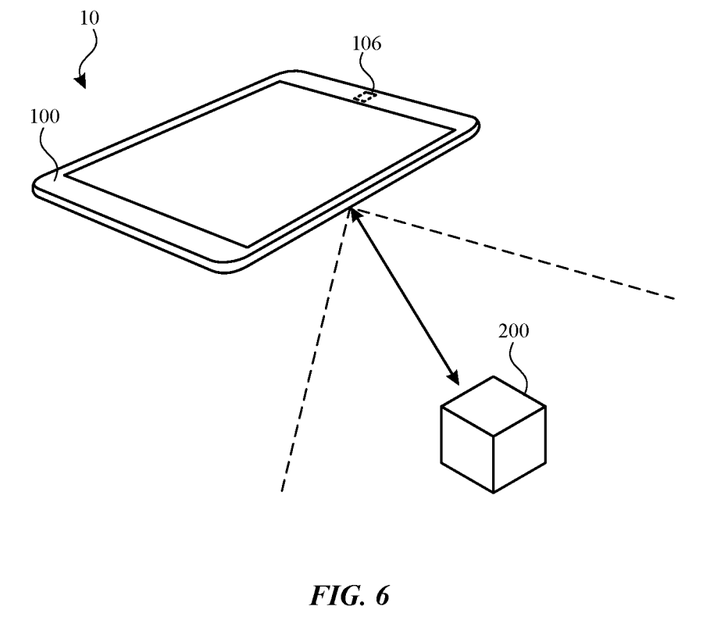
FIG. 6 illustrates an example system in which a user interface device can manage operational parameters of a managed device in accordance with one or more implementations.

FIG. 6 illustrates an example system in which a user interface device can manage operational parameters of a managed device in accordance with one or more implementations. As shown in FIG. 6, the user interface device 100 can identify a managed device 200 for display within a user interface, along with user selectable elements.

The user interface device 100 can include one or more detectors 106 for detection of the managed device 200. The detectors 106 may include, for example, one or more image sensors, one or more depth sensors, one or more infrared sensors, one or more thermal (e.g., infrared) sensors, and/or generally any sensors that may be used to detect the managed device 200. In one or more implementations, the communication interface 108 may be used to detect the managed device 200, such as by detecting beacon signals transmitted by the managed device 200 and/or one or more components thereof.

The managed device 200 may be associated with a visual identifier (or visual cue) that can be used to distinctly identify the managed device 200 to the user interface device 100. The visual identifier may be, for example, a particular color scheme of the managed device 200, a particular shape of the managed device 200, a particular size of the managed device 200, a particular marking on the managed device 200, such as quick response (QR) codes or other bar codes or markings, a visual feature or marking that is exposed through image processing, and/or generally any combination thereof.

For explanatory purposes, the subject system is discussed herein with respect to a physical item. However, as discussed above, the subject system is not limited to physical items. For example, the subject system may also be applicable to projections of physical items, such as two-dimensional projections and/or three-dimensional/holographic projections.

Figure 7:
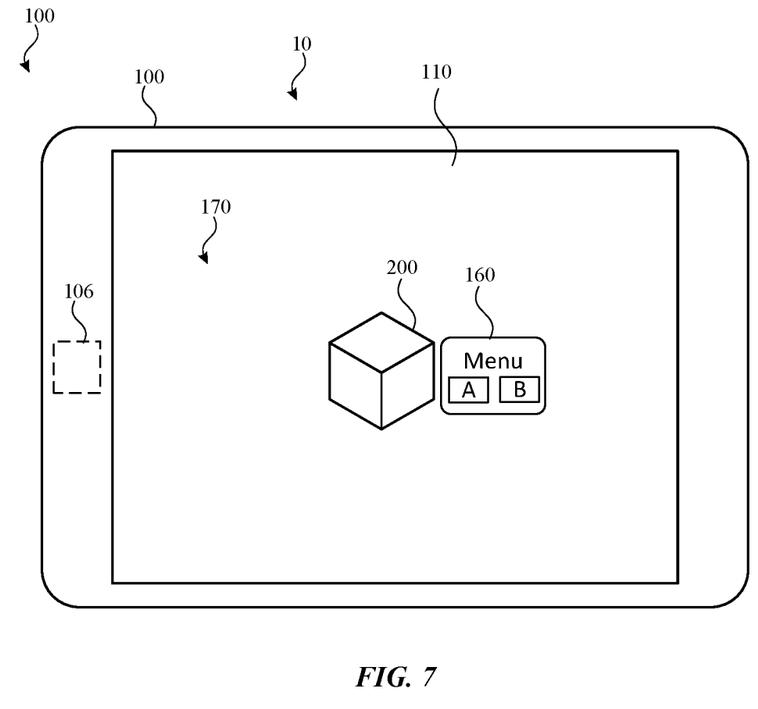
FIG. 7 illustrates a user interface device displaying an example user interface for providing a configuration of a managed device in accordance with one or more implementations.

FIG. 7 illustrates a user interface device displaying an example user interface for providing a configuration of a managed device in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

As shown in FIG. 7, the user interface device 100 can include a display 110 that displays the user interface 170. The user interface 170 can be displayed when the managed device 200 is detected to be within a vicinity of the user interface device 100 and/or a component thereof, such as the display 110, as described herein. For example, a threshold distance can be set such that, if the managed device 200 is determined to be within the threshold distance, the user interface 170 can be displayed.

The user interface 170 can include a view of the managed device 200, as captured by detector (e.g., camera). The view can further include a physical environment in which the managed device 200 is located.

The user interface 170 can further include a menu or other indicator that relates to one or more operating parameters of the managed device 200. For example, the user interface 170 can display an indicator that corresponds to a present value of an operating parameter of the managed device 200. The present value can be based on a communication from the managed device 200 to the user interface device 100, according to a communication protocol there between. Such a communication protocol can be based on queries and responses between the devices and initiated by either one of the devices.

By further example, the user interface 170 can display one or more selectable elements that, when selected, modify an operating parameter of the managed device 200. The user interface device 100 can provide one or more user input elements 120 that facilitate selection by a user, according to the user interface 170. Such selections can be communicated to the managed device 200 (e.g., via a signal) according to a communication protocol between the managed device 200 and the user interface device 100. Such a communication protocol can be based on queries and responses between the devices and initiated by the user interface device 100 in response to a user selection.

The user interface 170 can optionally be provided as an overlay among other elements provided on the display 110. For example, the user interface 170, or portions thereof, can occupy only a portion of the display 110, thereby allowing other displayed elements to remain visible. Such elements can include the view of the physical environment in which the managed device is located. It will be understood that the user interface 170 can occupy any portion and/or all of the display 110.

The user interface 170, or portions thereof, can be displayed at a region of the display 110 that corresponds to the position of the managed device 200 with respect to the user interface device 100 and/or a component thereof (e.g., the display 110). For example, where the managed device 200 is displayed within a region of the display 110 (e.g., based on the view captured by the detector 106), the user interface 170 can be displayed at least partially at or near such a region. Such positioning within the user interface 170 can provide confirmation to the user that the appropriate managed device is being recognized.

The user interface 170 can be updated as the managed device 200 moves with respect to the user interface device 100 and/or a component thereof (e.g., the display 110). For example, as the position of the managed device 200 is changed within the user interface 170 on the display 110, the user interface 170 can be updated or replaced to display the menu or other indicator at a new location that corresponds to the new position of the managed device 200 as provided in the display 110. Such updates can provide additional confirmation to the user that the appropriate managed device is being recognized.

The user interface 170 can be updated as the managed device 200 moves out of the view captured by the detector 106. For example, if the managed device 200 is no longer within the view captured by the detector 106, the user interface 170 can be updated to replace or remove the menu or other indicator.

It will be understood that user selections made within the user interface 170 can be communicated to the managed device 200 for further operation according to the user selections. Alternatively, the user interface device 100 can provide functions based on the user selections and independent of the managed device 200. For example, a menu or other indicator relating to the managed device 200 can be provided, and user selections can result in actions performed by the user interface device 100, rather than the managed device 200. Such actions can provide functionality that is outside the capabilities of the managed device 200 alone.

Figure 8:
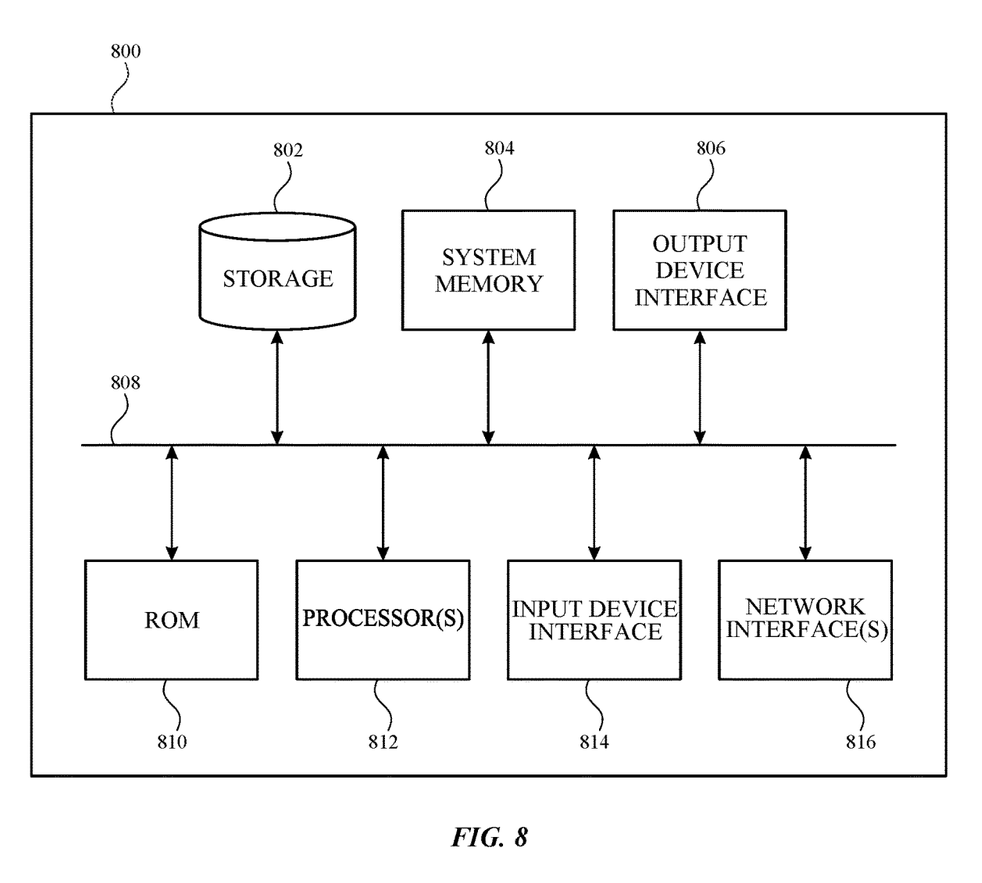
FIG. 8 conceptually illustrates an electronic system with which aspects of the subject technology may be implemented in accordance with one or more implementations.

FIG. 8 conceptually illustrates an electronic system 800 with which one or more implementations of the subject technology may be implemented. The electronic system 800 can be, and/or can be a part of, the user interface device 100, the managed device 200, and/or the additional device 300. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

Accordingly, embodiments of the present disclosure provide systems and devices of with mechanisms for managing devices that lack certain user interfaces by operation of a separate device that includes a user interface. Such user interfaces, such as a display and/or a user input element can be operated on one device (e.g., a user interface device) to manage the operational parameters of a different device (e.g., a managed device). The user interface device can provide input and/or output features when the managed device is brought into a vicinity of the user interface device. The selected operational parameters can then be applied when the managed device is operated independently of the user interface device and/or with another device.

Various examples of aspects of the disclosure are described below as clauses for convenience. These are provided as examples, and do not limit the subject technology.

Clause A: a user interface device, comprising: a display; a user input element; antenna elements configured to detect a location of a managed device with respect to the display; and a processor configured to: detect, with the antenna elements, a position of the managed device with respect to the display; and provide an indicator at a position on the display corresponding to the position of the managed device with respect to the display, the indicator corresponding to an operating parameter of the managed device.

Clause B: a user interface device, comprising: a display; a user input element; a detector; and a processor configured to: detect, with the detector, that a managed device is in a vicinity of the display, wherein the managed device does not include a display; provide, on the display, an indicator corresponding to an operating parameter of the managed device; receive, with the user input element, a user input indicating a modification of the operating parameter; and transmit, to the managed device, a signal indicating the modification of the operating parameter.

Clause C: a managed device, comprising: a communication interface configured to communicate with: a user interface device comprising a display and a user input element for controlling an operating parameter of the managed device, wherein the managed device does not include a display; and an additional device; and a processor configured to: transmit, to the user interface device, a first signal indicating an identity of the managed device when the managed device is in a vicinity of the user interface device; receive, from the user interface device, a signal indicating an updated operating parameter of the managed device; and execute an operation based on the updated operating parameter when the managed device is in a vicinity of the additional device.

One or more of the above clauses can include one or more of the features described below. It is noted that any of the following clauses may be combined in any combination with each other, and placed into a respective independent clause, e.g., clause A, B, or C.

Clause 1: the processor is further configured to: detect, with the antenna elements, a new position of the managed device with respect to the display; and provide the indicator at a new position on the display corresponding to the new position of the managed device with respect to the display.

Clause 2: the processor is further configured to: receive, with the user input element, a user input indicating a modification of the operating parameter; and transmit, to the managed device, a signal indicating the modification of the operating parameter.

Clause 3: the antenna elements are distributed about the display.

Clause 4: the antenna elements are distributed across the display.

Clause 5: the user input element is a touchscreen overlaid with the display.

Clause 6: the managed device does not include a display.

Clause 7: the managed device does not include a user input element for controlling the operating parameter.

Clause 8: the managed device is operable independently of the user interface device and according to the operating parameter.

Clause 9: the detector comprises antenna elements configured to detect a location of the managed device with respect to the display.

Clause 10: the processor is further configured to provide the indicator at a position on the display corresponding to the position of the managed device with respect to the display.

Clause 11: the user input element is a touchscreen overlaid with the display.

Clause 12: the detector comprises a camera for capturing a view of the managed device.

Clause 13: the managed device does not include a user input element for controlling the operating parameter.

Clause 14: the indicator comprises a user-selectable element that, when selected by a user operating the user input element, indicates the modification of the operating parameter Clause 15: the processor is further configured to record the updated operating parameter.

Clause 16: the managed device does not include a user input element for controlling the operating parameter.

Clause 17: the processor is configured to execute the operation by transmitting, to the additional device, a third signal based on the updated operating parameter.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different from the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A user interface device, comprising:
    a display;
    a user input element;
    antenna elements configured to detect a signal from a managed device; and
    a processor configured to:
        detect, based on the signal detected by the antenna elements, a position of the managed device with respect to the display;
        provide an indicator at a position on the display corresponding to the position of the managed device with respect to the display, the indicator corresponding to an operating parameter of the managed device;
        receive, with the user input element, a user input indicating an instruction to modify the operating parameter of the managed device; and
        transmit, to the managed device, a signal comprising the instruction to modify the operating parameter of the managed device, wherein the operating parameter forms a basis of an operation of the managed device when the managed device is not used in concert with the user interface device.

2. The user interface device of claim 1, wherein the processor is further configured to:
    detect, with the antenna elements, a new position of the managed device with respect to the display; and
    provide the indicator at a new position on the display corresponding to the new position of the managed device with respect to the display.

3. The user interface device of claim 1, wherein the antenna elements are distributed about the display.

4. The user interface device of claim 1, wherein the user input element is a touchscreen overlaid with the display.

5. The user interface device of claim 1, wherein the managed device does not include a display.

6. The user interface device of claim 1, wherein the managed device does not include a user input element for controlling the operating parameter.

7. The user interface device of claim 1, wherein the managed device is operable independently of the user interface device and according to the operating parameter.

8. A user interface device, comprising:
    a display;
    a user input element;
    a detector comprising an array of antennas distributed at various locations that overlap the display, each of the antennas being configured to detect a signal from a managed device; and
    a processor configured to:
        detect, based on detections of the signal by the antennas, that the managed device is in a vicinity of the display, wherein the managed device does not include a display;
        provide, on the display, an indicator corresponding to an operating parameter of the managed device, the indicator comprising a present value of the operating parameter and a selectable element for modifying the operating parameter, the indicator being provided at a position on the display corresponding to the position of the managed device with respect to the display;
        receive, with the user input element, a user input with respect to the selectable element, the user input indicating a modification of the operating parameter; and
        transmit, to the managed device, a signal comprising the instruction to modify the operating parameter of the managed device.

9. The user interface device of claim 8, wherein the user input element is a touchscreen overlaid with the display.

10. The user interface device of claim 8, wherein the detector further comprises a camera for capturing a view of the managed device.

11. The user interface device of claim 8, wherein the managed device does not include a user input element for controlling the operating parameter.

12. A managed device, comprising:
    a communication interface configured to communicate with:
        a user interface device comprising a display and a user input element for controlling an operating parameter of the managed device, wherein the managed device does not include a display; and
        an additional device; and
    a processor configured to:
        transmit, to the user interface device, a first signal indicating an identity of the managed device when the managed device is in a vicinity of the user interface device;
        receive, from the user interface device, a signal indicating an updated operating parameter of the managed device, wherein the signal corresponds to a user input received at a user input element of the user interface device; and
        execute an operation based on the updated operating parameter in response to a detection that the managed device is in a vicinity of the additional device and when the managed device is not used in concert with the user interface device.

13. The managed device of claim 12, wherein the processor is further configured to record the updated operating parameter.

14. The managed device of claim 12, wherein the managed device does not include a user input element for controlling the operating parameter.

15. The managed device of claim 12, wherein the processor is configured to execute the operation by transmitting, to the additional device, a third signal based on the updated operating parameter.

* * * * *